June 21, 1932.  A. H. MITTAG  1,864,364
SYSTEM OF DISTRIBUTION
Filed May 9, 1925
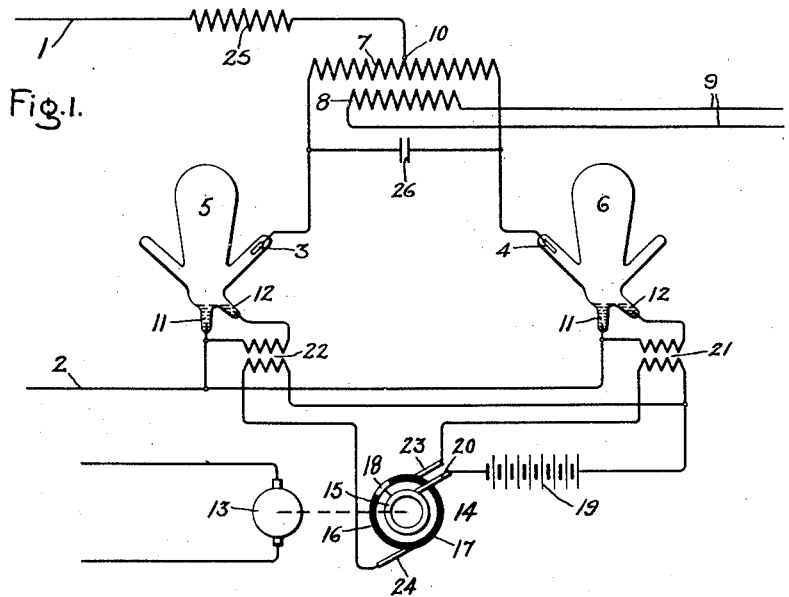
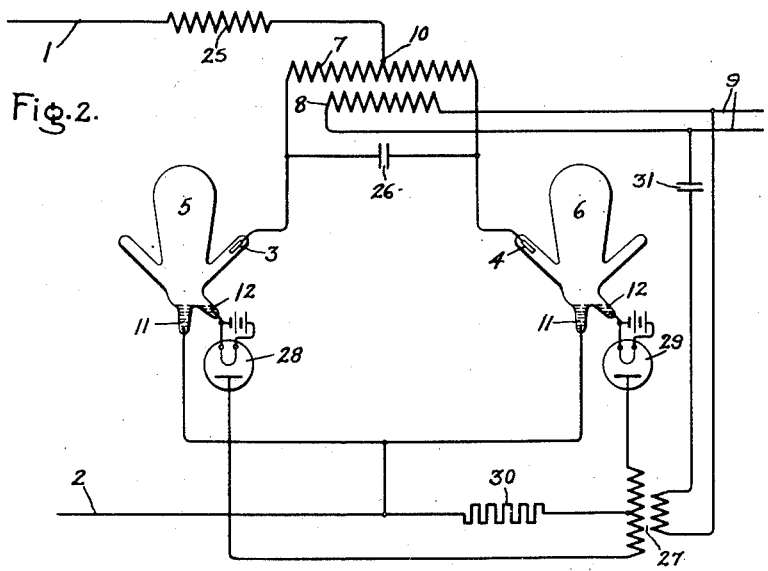
Inventor:
Albert H. Mittag,
by *Alexander F. Lund*
His Attorney.

Patented June 21, 1932

1,864,364

UNITED STATES PATENT OFFICE

ALBERT H. MITTAG, OF SCHENECTADY, NEW YORK, ASSIGNOR TO GENERAL ELECTRIC COMPANY, A CORPORATION OF NEW YORK

SYSTEM OF DISTRIBUTION

Application filed May 9, 1925. Serial No. 29,200.

My present invention relates to a system of distribution in which it is desired to change direct current of one voltage into alternating current of another voltage. One of the objects of my invention is to provide a simple and effective means for effecting the conversion of currents of high voltage.

The novel features which I believe to be characteristic of my invention are set forth with particularity in the appended claims. My invention itself, however, both as to its organization and method of operation will best be understood by reference to the following description taken in connection with the accompanying drawing in which Fig. 1 shows diagrammatically a circuit organization whereby my invention may be carried into effect. Fig. 2 shows diagrammatically a modified form of my invention.

I have indicated in Fig. 1 a system in which direct current from mains 1 and 2 is supplied through anodes 3 and 4 of vapor electric devices, or valves, 5 and 6 to the primary winding 7 of a main transformer having a secondary winding 8. The opposite terminals of the secondary winding are connected to a load circuit 9. Direct current main 1 is connected to the middle point 10 of winding 7, and main 2 is connected to the cathodes 11 of the valves, so that current impulses, supplied to winding 7 by two valves, flow in opposite directions through winding 7.

The valves are controlled in the desired manner by intermittently energizing a connection between each cathode 11 and its associated auxiliary starting anode 12. The connections for this purpose include a motor 13, which may be of any type of constant speed motor, and a commutator or switch device 14 driven thereby. The commutator comprises a ring 15 of conducting material and a ring 16 composed for the greater part of insulating material 17 but which has a conducting segment 18 electrically connected with ring 15. One terminal of a battery 19 is connected to ring 15 through brush 20. The other battery terminal is connected to one end of the primary winding of each of two starting transformers 21 and 22. The other ends of the two primary transformer windings are connected to brushes 23 and 24 respectively which cooperate with ring 16 at opposite points thereof. The secondary windings of transformers 22 and 21 are connected to the cathode 11 and starting anode 12 of each valve.

In the operation of the device, when current is supplied to winding 7, if motor 13 is in operation, current impulses will be alternately and intermittently supplied to primary windings of transformers 21 and 22. The transformers have a high ratio of transformation so that with a relatively small voltage impressed on the primaries a voltage is produced in the secondary winding that is great enough to produce a spark between a starting anode 12 and a cathode 11. The spark is sufficient to start the main anode current which will continue to flow until it is commutated by the static condenser 26. The successive energization of the valves 5 and 6 will cause current to alternately flow in the two halves of winding 7 and thus produce an alternating electromotive force in winding 8. The frequency of the alternating electromotive force produced in winding 8 will be determined by the speed of motor 13.

In order to secure the most satisfactory operation of the system of the type shown, it is necessary that momentary fluctuations in the direct current supply during the period when the current is transferred from one valve to another, should be prevented. This may be accomplished by inserting a reactance 25 in series with the direct current supply.

The system shown in Fig. 2 differs from that shown in Fig. 1 in that the control of the valve starting means is effected solely by electrical means. As in Fig. 1, current is supplied through direct current mains 1 and 2, and valves 5 and 6 to a main transformer having a primary winding 7, and a secondary winding 8 connected to a load circuit 9. A condenser 26 is connected across winding 7 as in the previous figure to effect commutation of the current.

In order to control the supply of current impulses to winding 7 I employ a transformer 27 having a primary winding connected across the terminals of a secondary winding 8. The terminals of the secondary winding of transformer 27 are connected to the starting anodes 12 of valves 5 and 6 through one way valves 28 and 29, which in the present instance are high vacuum fuse electron discharge valves. The mid point of the secondary of transformer 27 is connected through a resistance 30 to the cathodes 11 of valves 5 and 6, the resistance serving merely to limit the flow of current to the starting device. With the arrangement shown in this figure when a high voltage is produced between a starting anode and a cathode of one of the vapor electric devices a spark will bridge the gap and thus start the main anode current in that valve. When alternating current is used for control the arc-over will occur twice during a complete cycle, i. e. there will be an arc over at the peak of each half wave of electromotive force, and in each case it will start the arc between the main anode and cathode. By connecting an electric valve in series with each starting anode of the secondary winding 27, as shown, the valves will pass current in one direction only. Control will be effected by each valve only once in a cycle, and the half wave of electromotive force that is not desired to spark over and start the arc will be suppressed by each valve. The frequency of the impulses supplied to winding 8 will be controlled by the saturation of the main transformer and by condenser 31.

What I claim as new and desire to secure by Letters Patent of the United States, is:

1. In combination a source of direct current, a winding connected to said source through a plurality of vapor electric devices, said vapor devices each having an anode and a cathode, means including an auxiliary starting anode associated with each of said vapor devices for starting an arc therein, a circuit for exciting said starting anodes with opposite polarity from the potential across said winding, and a unilaterally conductive device included in said circuit in series with each starting anode.

2. In combination a source of direct current, an alternating current circuit, means including an inductive winding and a plurality of vapor electric devices for transmitting energy therebetween, each of said devices being provided with an anode, a cathode, and an auxiliary starting electrode for starting an arc therein, a control transformer energized from said alternating current circuit and connected to excite said auxiliary electrodes with potentials of opposite polarity, and an electric valve in series with each starting electrode, whereby alternate half cycles of potential of said control transformer are effective to start an arc in each device.

In witness whereof, I have hereunto set my hand this 7th day of May, 1925.

ALBERT H. MITTAG.